# United States Patent [19]

Rath et al.

[11] 4,342,382
[45] Aug. 3, 1982

[54] TWIN-PIN SLIDING CALIPER DISC BRAKES

[75] Inventors: Heinrich B. Rath, Vallendar; Hans J. Wienand, Steimel, both of Fed. Rep. of Germany

[73] Assignee: Lucas Industries Limited, Birmingham, England

[21] Appl. No.: 115,388

[22] Filed: Jan. 25, 1980

[30] Foreign Application Priority Data

Jan. 25, 1979 [GB] United Kingdom ................. 7902702
Jun. 16, 1979 [GB] United Kingdom ................. 7920928

[51] Int. Cl.³ ............................................. F16D 65/00
[52] U.S. Cl. ............................... 188/73.45; 188/73.47
[58] Field of Search .................. 188/72.4, 73.3, 73.4, 188/73.45, 73.47

[56] References Cited

U.S. PATENT DOCUMENTS

| Re. 29,582 | 3/1978 | Brown | 188/73.3 |
| Re. 30,255 | 4/1980 | Rath et al. | 188/73.3 |
| 3,682,277 | 8/1972 | Brown | 188/73.3 |
| 3,688,876 | 9/1972 | Hirai et al. | 188/73.3 |
| 4,060,154 | 11/1977 | Smith | 188/73.3 |
| 4,121,698 | 10/1978 | Baum | 188/73.3 |
| 4,189,032 | 2/1980 | Farr | 188/73.3 |

FOREIGN PATENT DOCUMENTS

| 2707058 | 8/1977 | Fed. Rep. of Germany | 188/73.3 |
| 1381709 | 1/1975 | United Kingdom | 188/73.3 |

Primary Examiner—David L. Lacey
Attorney, Agent, or Firm—Scrivener, Clarke, Scrivener and Johnson

[57] ABSTRACT

The present specification describes and claims a twin-pin sliding caliper disc brake comprising a caliper and a torque taking member, the caliper being slidably mounted on the torque taking member on two parallel pins. One pin is fixedly and immovably secured in position on the torque taking member and the other pin is secured to the torque taking member so as to be movable to a limited extent. Thus, during brake assembly, the said other pin can be adjusted to provide for positive drag sharing between the pins during normal braking.

10 Claims, 20 Drawing Figures

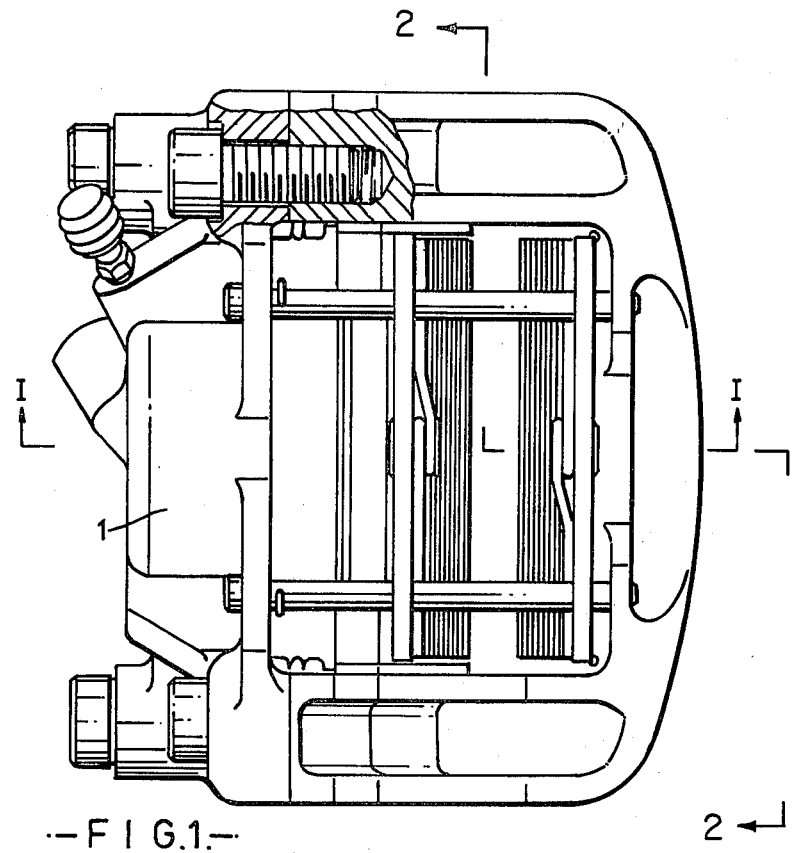
-FIG.1.-
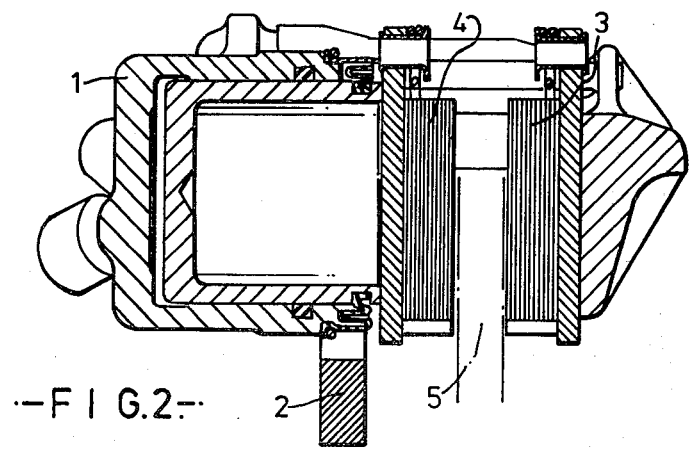
-FIG.2.-

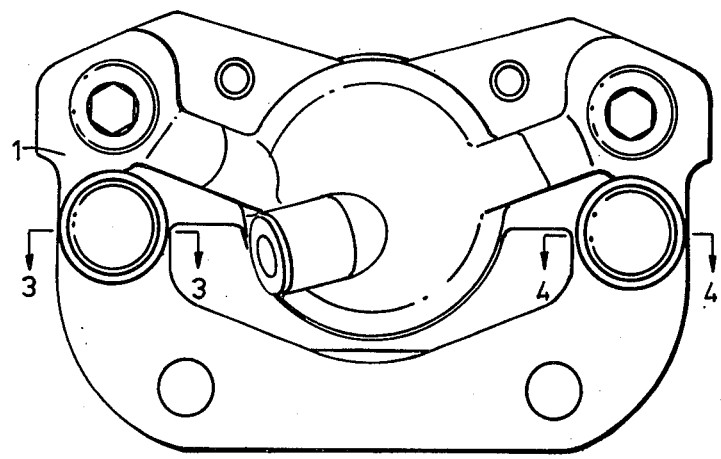
—FIG.3.—
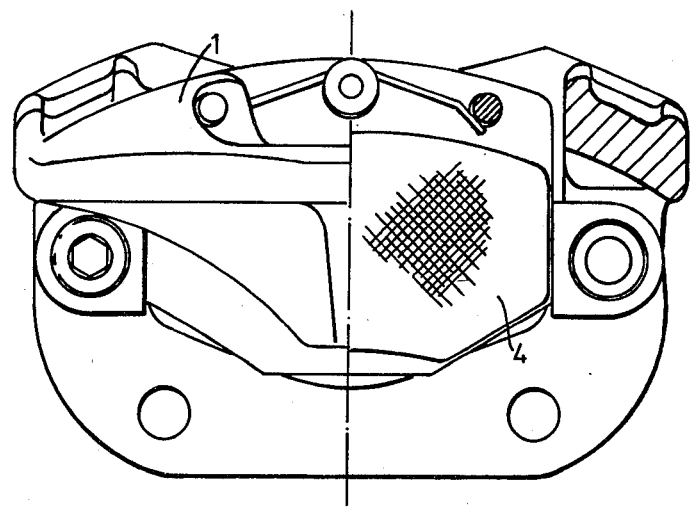
—FIG.4.—

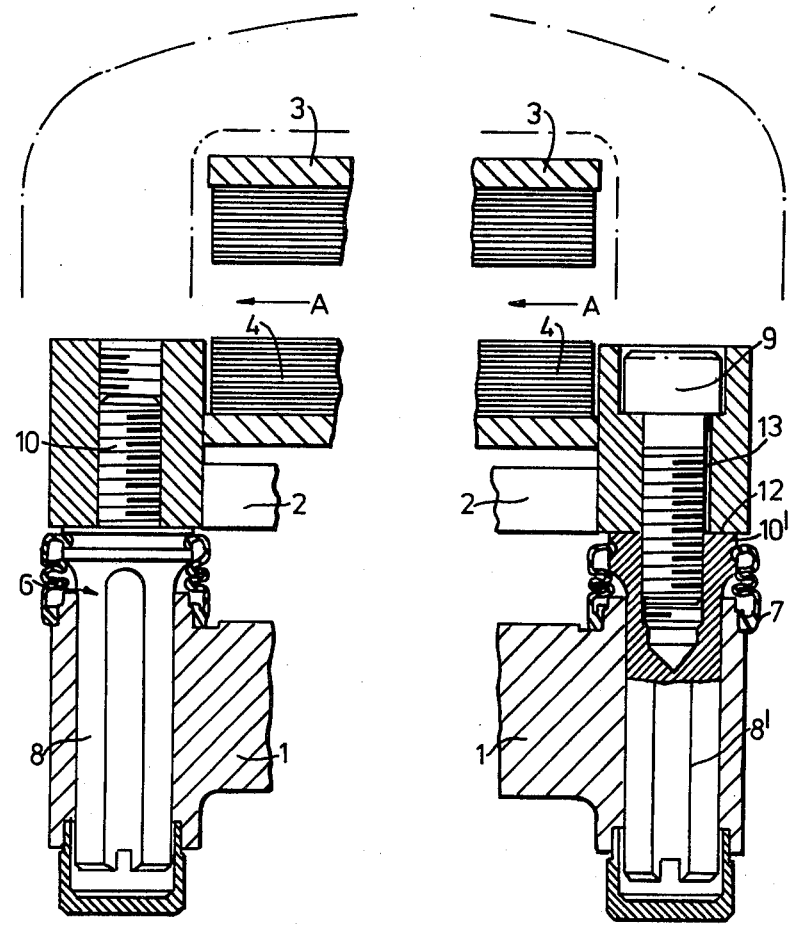
—FIG.6a.—   —FIG.6b.—

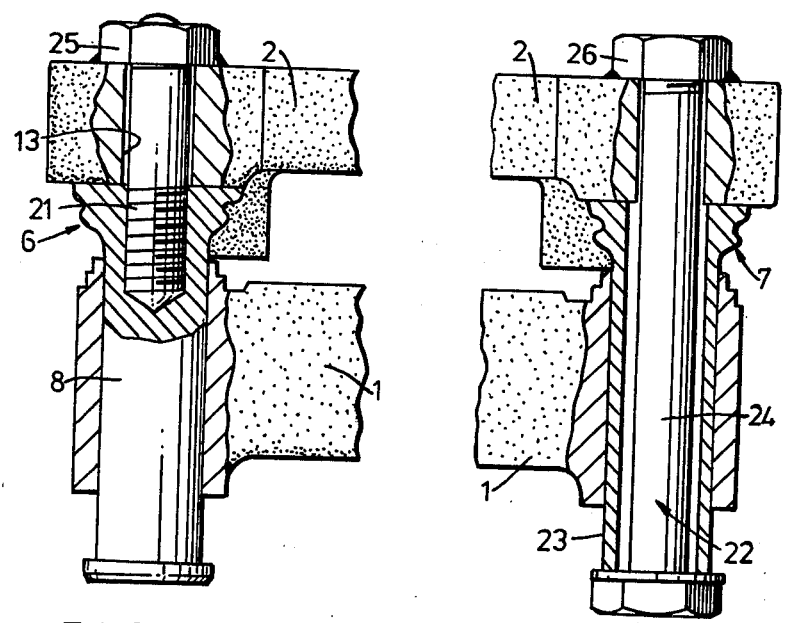
-FIG.11a- -FIG.11b-

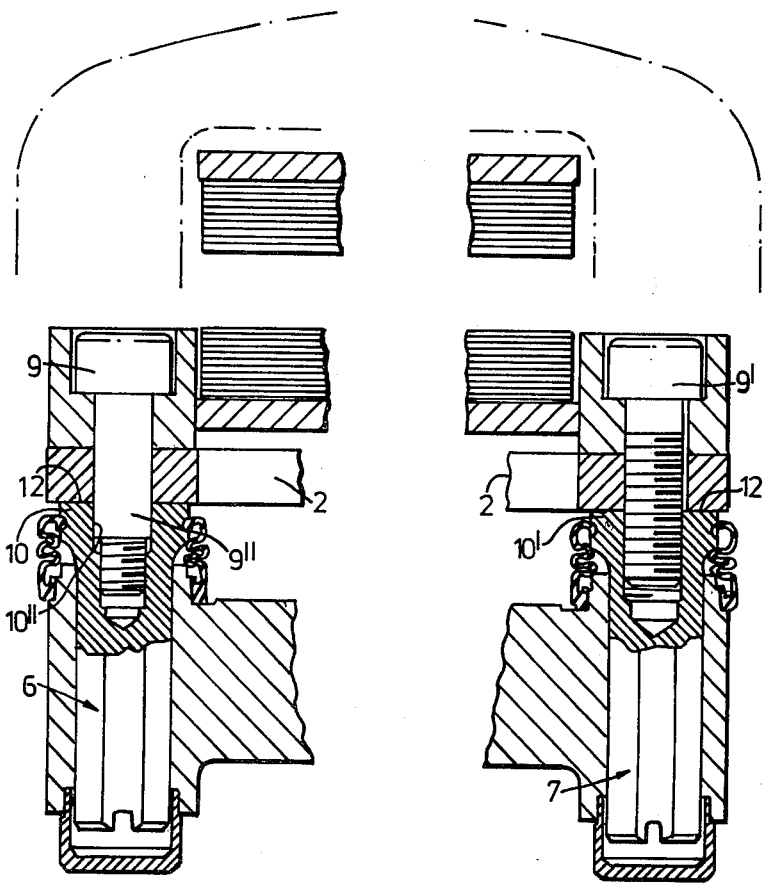
—FIG.12a.—  —FIG.12b.—

TWIN-PIN SLIDING CALIPER DISC BRAKES

The present invention relates to a twin-pin sliding caliper disc brake.

Such twin-pin sliding caliper brakes basically comprise a torque taking member and a caliper which is slidable by means of a two pin connection, relative to the torque taking member. The caliper member supports hydraulic and/or mechanical means which when actuated cause friction pad assemblies to engage and grip each side of a disc. When the brake is applied the drag force from both of the friction pad assemblies can either be taken solely by the torque taking member, or the outboard pad drag is taken through the caliper member to the pins and the inboard pad drag is taken directly on the torque taking member, or the total pad drag is taken by both the pins via the caliper member. In some such brakes, the drag force, which ideally should be taken by both pins, is taken effectively by only one of the pins. This is a disadvantage which can occur due to unavoidable manufacturing tolerances, one pin engaging the wall of a bore in the caliper while the other pin is located, due to the spacing of the pins, with minimal clearance in another caliper bore. Thus all the drag force is taken by one pin. In such a case the cross section of the drag taking pin should be greater than if the drag was shared by two pins. In order to accommodate drag taking in both forward and reverse directions pins of similar proportions may have to be used. However, any increase in cross sectional area of the drag taking pins may necessitate similar increases in material in the pin housing member, another unsatisfactory situation with regard, for example, to weight.

Further, with fixed pins at an accurate setting, flexing of the torque taking member under heavy braking can cause the pins to jam in the bores impairing efficient brake operation. This is dangerous and clearly undesirable.

It is an aim of the present invention to provide a twin-pin sliding caliper disc brake wherein a definite sharing of the drag forces between the pins is achieved and efficient brake performance is assured at all times.

According to the present invention there is provided a twin-pin sliding caliper disc brake comprising a caliper and a torque taking member, the caliper being slidably mounted on the torque taking member on two parallel pins, one pin being fixedly secured to the torque taking member so that it is immovable relative to the torque taking member and the other pin being secured to the torque taking member so as to be movable to a limited extent.

Thus by making one pin immovably secure to the torque taking member, the other pin which is movable to a limited extent can be adjusted during assembly to take up any tolerances in the torque taking member, caliper and pin construction so that the drag forces are positively shared between the pins during all normal brake operation, no one pin alone taking all of the drag forces.

During heavy braking when the torque taking member may flex, frictional interengagement between the movable pin and the torque taking member can be overcome so that the movable pin is moved relative to the torque taking member preventing jamming of the pins in the caliper and ensuring efficient brake performance.

The fixed pin may take any form e.g. elongate member and locking bolt, the pin being secured against any possible movement relative to the torque taking member. Concerning the movable pin this also may take any suitable form e.g. bolt and sleeve, or elongate member and locking bolt, the main criterion being that it is movable parallel to the fixed pin to preset its position relative to the fixed pin.

In all of the possible embodiments the movable pin can be adjusted during assembly of the brake and tightened in a position such that in one direction of braking both pins are in engagement with the caliper thus providing for positive drag sharing between the pins. Thus positive drag sharing is ensured during normal braking. In the event of excessively heavy braking the torque taking member may flex causing the movable pin to move, the frictional interengagement between the movable pin and the torque taking member being overcome. This movement of one pin means that under such heavy braking the pins do not jam in the caliper and efficient braking is ensured.

The present invention will now be further described, by way of example, with reference to the accompanying drawings, in which:

FIG. 1 is a plan view of one embodiment of the present invention;

FIG. 2 is a side elevation of the embodiment of FIG. 1 sectioned through I—I;

FIG. 3 is a rear view of the embodiment of FIG. 1;

FIG. 4 is a front view and part section through 2—2 of the embodiment of FIG. 1;

FIG. 6a is a cross-sectional view similar to that of FIG. 5a of another embodiment of the present invention;

FIG. 6b is a cross-sectional view similar to that of FIG. 5b of the embodiment shown in part in FIG. 6a;

FIG. 7b is a cross-sectional view similar to that of FIG. 5a of the embodiment shown in part in FIG. 7a.

FIG. 8a is a cross-sectional view similar to that of FIG. 5a, of another embodiment of the present invention;

FIG. 8b is a cross-sectional view similar to that of FIG. 5b of the embodiment shown in part in FIG. 8a;

FIG. 10b is a cross-sectional view similar to that of FIG. 5b of the embodiment shown in part in FIG. 10a;

FIG. 11a is a cross-sectional view similar to that of FIG. 5a of another embodiment of the present invention;

FIG. 11b is a cross-sectional view similar to that of FIG. 5b of the embodiment shown in part in FIG. 11a;

FIG. 12a is a cross-sectional view similar to that of FIG. 5a of another embodiment of the present invention; and FIG. 12b is a cross-sectional view similar to that of FIG. 5b of the embodiment shown in part in FIG. 12a.

Figures 5A, 5B:
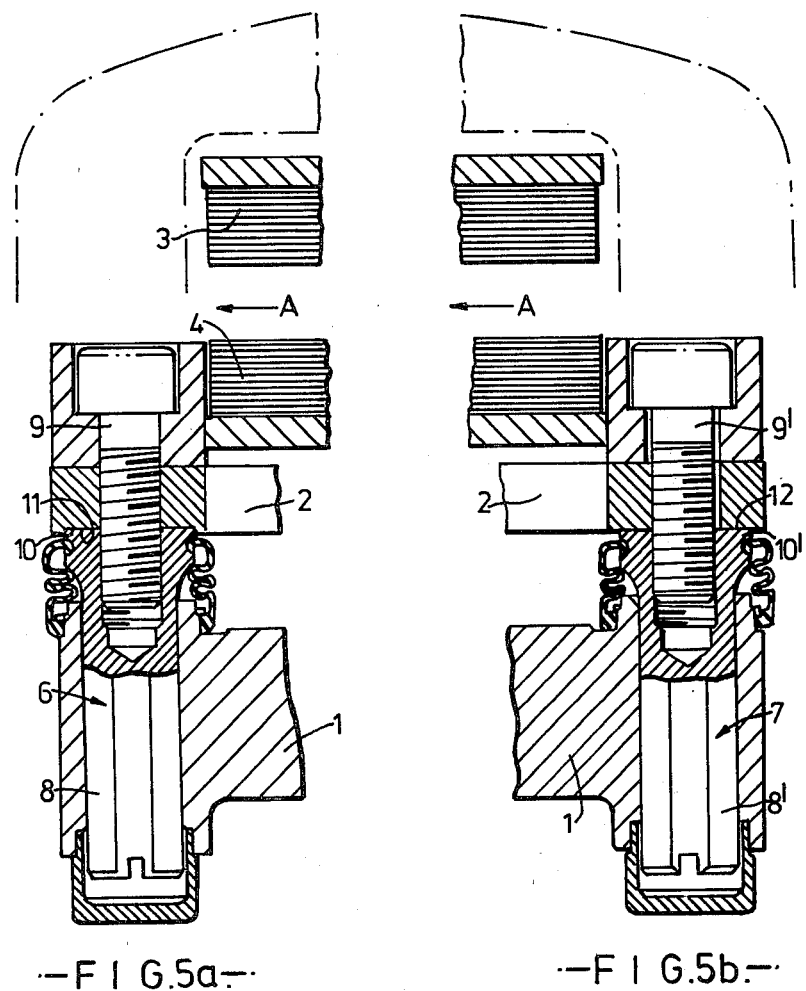
FIG. 5a is a cross-sectional view on line 3—3 of the embodiment of FIG. 3.
FIG. 5b is a cross-sectional view on line 4—4 of the embodiment of FIG. 3.

FIGS. 1, 2, 3, 4, 5a and 5b illustrate one embodiment of the present invention, the brake basically comprising a caliper or body 1 and a torque plate 2, two friction pad assemblies 3,4 being located in the brake, one on each side of disc 5. The outboard friction pad assembly 3 is supported by the caliper 1 and drag forces produced by the engagement of friction pad assembly 3 with disc 5 are transferred through the caliper 1 to the two pins 6 and 7 upon which the caliper is slidably mounted. The drag forces of the inboard friction pad assembly 4 are taken directly by the torque plate 2.

To provide for positive sharing of the drag forces between the two pins 6 and 7, the pins and torque plate 2 are interconnected as shown in FIGS. 5a and 5b. Both pins 6,7 comprise an elongate member 8,8' and a locking bolt 9,9', the elongate members each having an axial extension 10,10'. The axial extension 10 on pin 6 fits closely in a recess 11 in the torque plate 2 such that no movement is possible between the pin 6 and torque plate 2, the locking bolt 9 clamping the elongate member 8 in position. The face 12 of the axial extension 10' on pin 7 engages flush with the torque plate 2, the locking bolt 9' clamping the elongate member 8' in position, there now existing a frictional interengagement between end face 12 of axial extension 10' and the torque plate 2. In the event of heavy braking wherein the drag forces incurred may be sufficient to flex the torque plate 2 in the general direction of the arrow A, (i.e. in the direction of forward rotation for example), the pin 6, because of the mechanical interlocking of pin 6 to the torque plate 2, tends to follow the torque plate 2. Due to the fit of the elongate members 8,8' of pins 6 and 7 in caliper body 1, which is of rigid construction, there can be no change in the dimension between the centers of said pins, so that flexing of the torque plate 2 would, providing the drag force is sufficient, overcome the frictional interengagement. Thus the pin 7 moves relative to the torque plate and the pins do not jam in the caliper and efficient braking is ensured.

Alternative constructions for pins 6 and 7, for a brake according to the present invention, are shown in FIGS. 6a and 6b, FIGS. 7a and 7b, FIGS. 8a and 8b, FIGS. 9a and 9b, FIGS. 10a and 10b, FIGS. 11a and 11b and FIGS. 12a and 12b. Parts similar to those in FIGS. 5a and 5b are identified by the same reference numerals.

In FIGS. 6a and 6b, the pin 6 comprises an elongate member 8 with axial extension 10 which threadingly engages the torque plate 2, thereby immovably securing pin 6. Pin 7 comprises an elongate member 8', and a locking bolt 9 which passes with clearance through bore 13 of the torque plate 2 to threadingly engage a blind bore in one end of elongate member 8'. The clamping action of the locking bolt 9 produces a frictional interengagement between the end face 12 of the axial extension 10' of pin 7 and the torque plate 2. Sharing is ensured in exactly the same was as described for FIGS. 5a and 5b, the only difference being that the mechanical interlocking of pin 6 is replaced by the threaded engagement of pin 6 in torque plate 2.

Figure 7A:
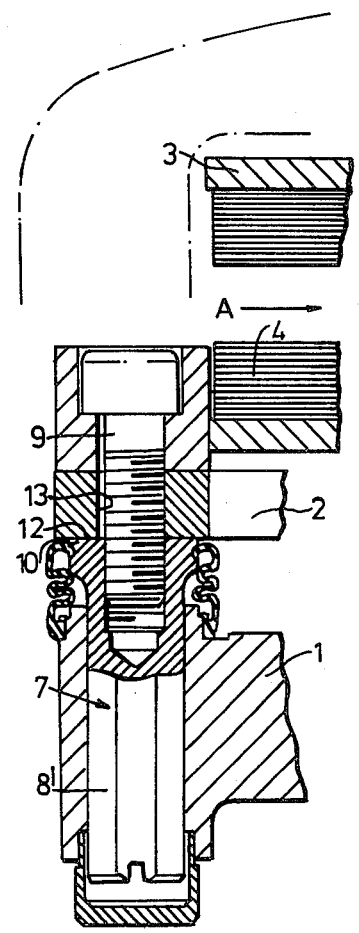
FIG. 7a is a cross-sectional view similar to that of FIG. 5b of a further embodiment of the present invention.
Figure 7B:
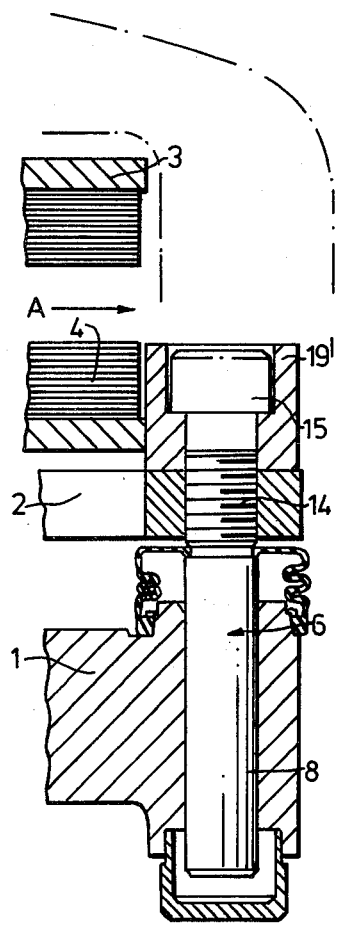

In FIGS. 7a and 7b, the positions of the movable pin 7 and the immovable pin 6 have been transposed relative to the general direction of forward rotation (arrow A). In FIG. 7a the pin 7 comprises an elongate member 8' with axial extension 10. A locking bolt 9 passes with clearance through bore 13 in the torque plate assembly to theadingly engage a blind bore in one end of elongate member 8', thus clamping the end face 12 of the pin 7 to the torque plate 2, there now existing a frictional interengagement between said end face 12 and the torque plate 2. With respect to FIG. 7b, the pin 6 comprises a threaded portion 14, which threadingly engages the torque plate 2, an integrally formed head 15 to provide a clamping means between the friction pad abutment 19' and the torque plate 2 and an axial elongate member 8 which slidably engages the caliper member 1, pin 6 thus being rendered immovable relative to the torque plate 2. During heavy braking the frictional interengagement of pin 7 with torque plate 2, may be overcome and the pin 7 may be moved. This thus ensures that the pins will not jam in the caliper member 1, and that efficient braking occurs whenever the brake is actuated.

Figures 8A, 8B:
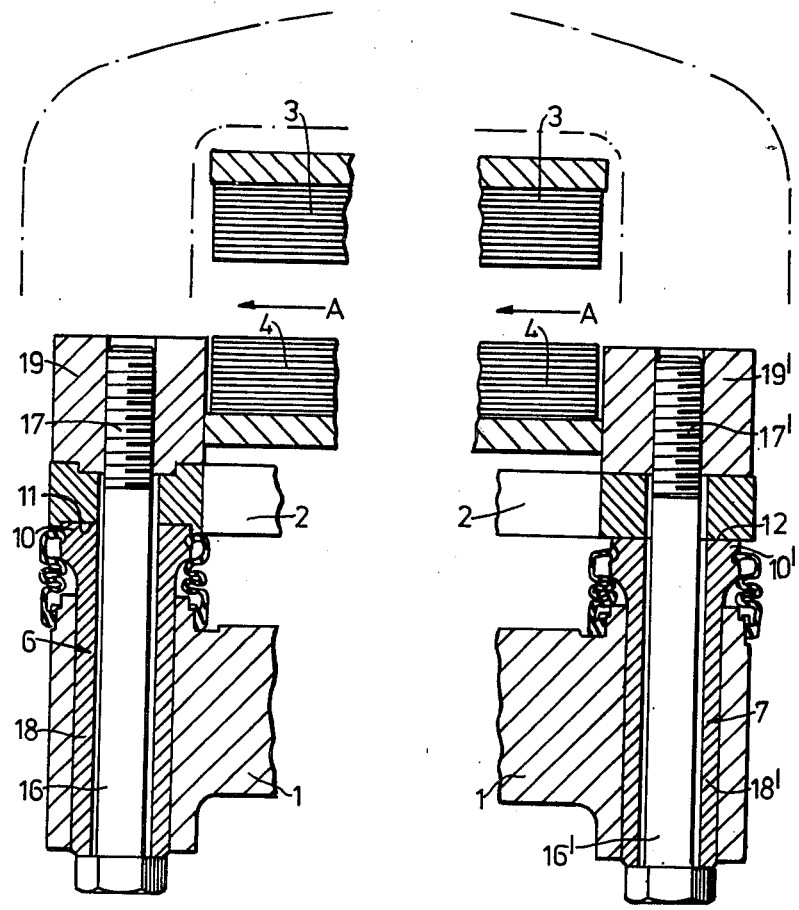

FIGS. 8a and 8b relate to another embodiment of the present invention. In FIG. 8a pin 6 comprises a sleeve 18 with axial extension 10 which is a close fit in recess 11 of torque plate 2, a bolt 16 with threaded end 17, passes through said sleeve with clearance to threadingly engage the friction pad abutment 19 of the torque plate assembly. In FIG. 8b, the construction of pin 7 is similar to that in FIG. 8a, with the exception that the mechanical interlocking is replaced by a frictional interengagement between the end face 12 of axial extension 10' of sleeve 18' and the torque plate 2. Such frictional interengagement results from the clamping action of the bolt 16' that passes therethrough, to threadingly engage the other friction pad abutment 19'. If, during heavy braking the drag forces incurred tend to flex the torque plate, pin 6 by virtue of its mechanical interlocking, would follow the deflected limb of the torque plate, the caliper member 1 maintaining the fixed separation of pins 6 and 7 would tend to move sleeve 18' relative to the bolt 16' passing therethrough thus ensuring that the pins do not jam in the caliper.

Figure 9A:
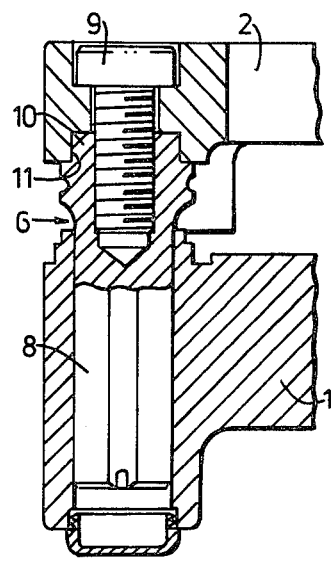
FIG. 9a is a cross-sectional view similar to that of FIG. 5a of another embodiment of the present invention.
Figure 9B:
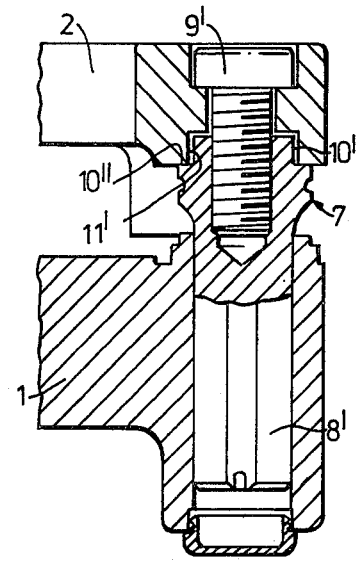
FIG. 9b is a cross-sectional view similar to that of FIG. 5b of the embodiment shown in part in FIG. 9a, FIG. 10a is a cross-sectional view similar to that of FIG. 5a of another embodiment of the present invention.

FIGS. 9a and 9b both pins 6,7 comprise an elongate member 8,8' and a locking bolt 9,9', the elongate members each having an axial extension 10,10' which engages in a recess 11,11' in the torque plate 2. The extension 10 on pin 6 is a close fit in recess 11 so that no movement is possible between the pin 6 and torque plate 2, the locking bolt 9 clamping the elongate member 8 in position. The extension 10' on pin 7 is however a clearance fit in recess 11' (see FIG. 9b), locking bolt 9' clamping the elongate member 8' in position. Pin 6 is fixed in position by both the clamping action of locking bolt 9 producing a frictional grip between the base of recess 11 and the end face of extension 10, and by the mechanical interlocking between extension 10 and the wall of recess 11. However axial extension 10' of pin 7 is a clearance fit in recess 11', only the frictional grip between the lateral shoulder 10" and the torque plate 2 due to the clamping action of locking bolt 9', holding the pin 7 in position. The clearance fit facilitates assembly of the brake, and enables the pin 7 to be adjusted to cater for inavoidable manufacturing tolerances. By adjusting the position of the pin 7 during assembly of the brake both pins can be brought into positive engagement with the caliper so that during normal braking there is definite drag sharing between the pins. In the event of heavy braking wherein the drag forces on the outboard pad assembly 4, are sufficient to overcome the frictional grip securing pin 7 to the torque plate. Movement of pin 7 relative to the torque plate 2, ensures that the pins do not jam in the caliper and the brake therefore operates as required. While the extension 10' on pin 7 is shown in a central position of recess 11', the construction is preferably such that extension 10' is against the wall of recess 11', thus ensuring positive sharing of the drag forces at all times in one direction.

Figure 10A:
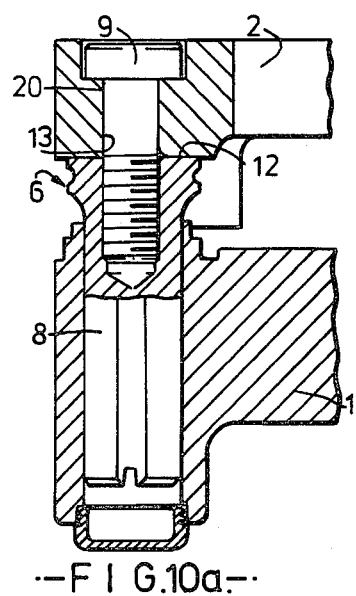
Figure 10B:
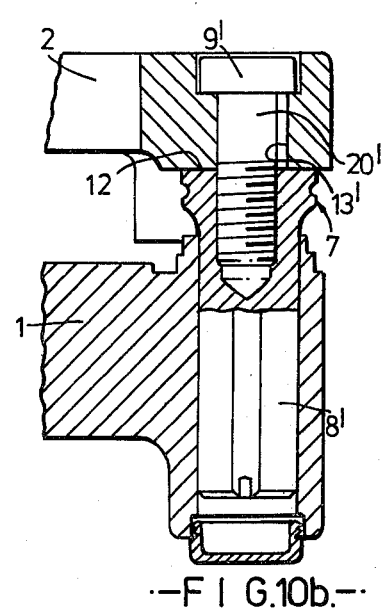

In FIGS. 10a and 10b, the pin 6 comprises an elongate member 8 and a locking bolt 9. The locking bolt 9 is a close fit in bore 13 in torque plate 2, the pinch bolt 9 having a smooth shank 20 and being screwed into a blind bore in an end of elongate member 8. The clamping action of pinch bolt 9 produces a frictional interengagement between the end face 12 of the elongate member 8 and the surface of the torque plate 2, and this frictional interengagement together with the close fit of shank 20 in bore 13 secures pin 6 in a fixed position. The only difference between pins 6 and 7 in FIGS. 10a and 10b is that shank 20' of pin 7 is a clearance fit in bore 13' in torque plate 2. Thus the frictional interengagement between end face 12' of pin 7 and the torque plate, alone secures pin 7 in position unless shank 20' engages the wall of bore 13'. This clearance fit facilitates assembly of the brake, the elongate members 8,8' being a close fit in their respective bores in the caliper 1. In the event of large drag forces when the torque plate flexes and the frictional clamping of pin 7 is overcome, the locking bolt 9' moves relative to the torque plate thus preventing the pins 6 and 7 from jamming in the caliper and thus ensuring efficient brake performance.

In FIGS. 9a, 9b, 10a and 10b the heads of the locking bolts 9,9' are recessed in the torque plate on the side adjacent to disc 5. Thus these bolts cannot normally be inadvertently slackened to alter the characteristic of the brake performance, once the brake has been initially assembled and installed.

In FIGS. 11a and 11b, the pin 6 comprises an elongate member 8 and a threaded stud 21, and pin 7 comprises a bolt 22 together with a sleeve 23 which engages with clearance over the shank 24 of bolt 22. Considering pin 6, the threaded stud 21 passes through a bore 13 in torque plate 2 and is screwed into a nut 25 secured to the torque plate. The threaded stud 21 is also screwed into a blind bore in the elongate member 8 of pin 6, elongate member 8 being thus clamped against the torque plate 2. Secure location of nut 25 and frictional interengagement between elongate member 8 and the torque plate ensure secure positioning of pin 6 at all times. In pin 7 the bolt 22 is screwed into nut 26 secured to the torque plate 2, the sleeve 23 being clamped between the head of bolt 22 and the torque plate 2. This clamping action produces a frictional interengagement between the sleeve 23 and both the head of bolt 22 and the torque plate, thus securing the sleeve 23 i.e. pin 7, in position. In the event of large drag forces when the torque plate flexes and the frictional clamping of sleeve 23 is overcome, the sleeve 23 moves thus preventing the pins 6,7 from jamming in the caliper. This therefore ensures efficient brake performance at all times.

In FIGS. 12a and 12b both pins 6,7 comprise an elongate member 8,8' and a locking bolt 9,9'. The locking bolt 9 of the fixed pin 6 has a cylindrical shaft 9" which is a snug fit in a bore in the torque plate 2 and in a complementary bore 10" in elongate member 8. An end region of locking bolt 9 has a reduced diameter and is threaded, this end region securing the pin 6 to the torque plate 2. The mating cylindrical shaft 9" and bore 10" ensure a more accurate positioning of pin 6 than is possible with the mere use of threaded interengagement. The movable pin 7 is secured to the torque plate by a locking bolt 9' which engages a threaded bore in the elongate member 8', the locking bolt 9' passing with clearance through a bore in torque plate 2.

In any of the above described embodiments of the present invention the movable pin 7 is adjusted relative to the torque plate 2 during assembly of the brake so that both pins 6,7 engage the same side of the caliper bores in which they are axially slidably located. The movable pin 7 is then tightened in this position. Under normal braking both pins 6,7 take the drag force at all times. The present invention thus allows for manufacturing tolerances and provides for positive drag sharing by both pins. In the event of heavy braking the torque plate 2 can flex thus overcoming the frictional interengagement between pin 7 and torque plate 2. This allowed movement for pin 7 prevents the pins from jamming in the caliper under heavy braking, thus ensuring efficient brake performance at all times.

The present invention thus assures positive sharing of the drag forces between the two pins of a twin-pin slider disc brake. The invention has been described hereabove with particular reference to a twin-pin slider brake wherein the drag force from one friction pad assembly is reacted directly through the caliper and from the other friction pad assembly through the torque plate. The invention however equally applies to twin pin slider disc brakes wherein both friction pad assemblies are reacted through the caliper.

We claim:

1. A twin pin sliding caliper disc brake comprising a caliper having two bores therein, and a torque taking member having two parallel pins, said caliper being slidably mounted on the torque taking member on said two parallel pins each of which is slidably engaged in a respective one of said bores in the caliper, one of said pins being fixedly secured to the torque taking member so that it is immovable relative to the torque taking member, and the other one of said pins being laterally movable to a limited extent relative to the torque taking member for adjustment of said other pin so that it can be adjusted to engage simultaneously and positively the same predetermined side of its bore in said caliper as does the fixed pin in its bore, the movable pin having a friction surface and means securing the friction surface of said movable pin in frictional engagement with said torque taking member after adjustment of said movable pin to engage said predetermined side of its bore whereby braking drag forces are positively shared between both pins during all normal brake operations and if the torque taking member flexes under heavy braking the frictional engagement between the movable pin and the torque taking member can be overcome so that the movable pin is moved relative to the torque taking member to prevent jamming of said pins in said caliper bores.

2. A disc brake according to claim 1, wherein said torque taking member includes a bore, and the movable pin comprises an elongate member having a threaded bore in one end and a locking bolt defining said securing means, said locking bolt passing with clearance through said bore in the torque taking member and engaging in said threaded bore provided in one end of the elongate member, the said one end engaging flush with the torque taking member and being held in frictional interengagement therewith by the clamping action of the locking bolt.

3. A disc brake according to claim 2, wherein said torque taking member includes a recess, said fixed pin comprising an elongate member having a threaded blind bore in one end and an axial extension having a close fit in said recess in the torque taking member, a second bore in said torque taking member, and a locking bolt extending through said second bore in the torque taking member and engaging in said threaded blind bore in the one end of the elongate member of the fixed pin.

4. A disc brake according to claim 2, wherein said torque taking member has a second threaded bore, said fixed pin comprising an elongate member having a threaded axial extension which engages in said second threaded bore in the torque taking member.

5. A disc brake according to claim 2, wherein said torque taking member has a second threaded bore, said fixed pin comprising a bolt having a head and a shaft, part of which shaft is threaded and engages in said second threaded bore in the torque taking member, the remainder of the shaft engaging in the caliper.

6. A disc brake according to claim 2, wherein said torque taking member has a second bore, said fixed pin comprising an elongate member having a threaded bore in an end thereof, and a locking bolt, the locking bolt of said fixed pin having an accurate fit in said second bore in the torque taking member and engaging in said threaded bore in said end of the elongate member.

7. A disc brake according to claim 2, wherein said torque taking member has a second bore therein, said fixed pin comprising an elongate member and a locking bolt, the locking bolt of said fixed pin having an end-threaded cylindrical portion which engages through said second bore in the torque taking member and is located complementarily in said bore in the end of the elongate member, the threaded end of the locking bolt threadedly engaging said threaded end region of said bore in the elongate member.

8. A disc brake according to claim 1, wherein each of said pins comprises a bolt and an elongate sleeve, the bolt passing through the sleeve to secure same to the torque taking member between a head of the bolt and the torque taking member, the torque taking member having a recess therein, the sleeve of the fixed pin engaging in said recess in the torque taking member, the sleeve of the movable pin being merely held in frictional engagement with the torque taking member, the bolt, passing with clearance through the sleeve of the movable pin.

9. A disc brake according to claim 1, wherein the torque taking member has first and second recesses, and first and second bores therein, said fixed pin comprising an elongate member and a locking bolt defining said securing means, the elongate member having a threaded blind bore in one end thereof and an axial extension having a close fit in said first recess in the torque taking member, the locking bolt extending through said first bore in the torque taking member and engaging in said threaded blind bore in one end of the elongate member, the movable pin also comprising an elongate member and a locking bolt, the elongate member of the movable pin also having a threaded bore in one end thereof and an axial extension engaging with clearance in said second recess in the torque taking member, the locking bolt of the movable pin passing through said second bore in the torque taking member and engaging in said threaded bore in the one end of the elongate member of said movable pin.

10. A disc brake according to claim 1, wherein said torque taking member has a bore therein and said fixed pin comprises an elongate member having a threaded bore in one end and a threaded shaft, the threaded shaft is secured by a nut which extends through said bore in the torque taking member and being engaged in said threaded bore in one end of the elongate member, the movable pin comprising a hollow sleeve through which a further bolt passes with clearance, this further bolt defining said securing means which secure the sleeve to the torque taking member with the sleeve clamped between the torque taking member and the head of the further bolt.

* * * * *